(12) United States Patent
Wilson

(10) Patent No.: US 7,718,280 B2
(45) Date of Patent: May 18, 2010

(54) METHOD FOR THE TREATMENT OF THE TIP OF A TURBINE BLADE AND A TURBINE BLADE TREATED WITH A METHOD SUCH AS THIS

(75) Inventor: Scott Wilson, Winterthur (CH)

(73) Assignee: Sulzer Metco (US), Inc., Westbury, NY (US)

( * ) Notice: Subject to any disclaimer, the term of this patent is extended or adjusted under 35 U.S.C. 154(b) by 918 days.

(21) Appl. No.: 11/485,387

(22) Filed: Jul. 13, 2006

(65) Prior Publication Data
US 2007/0099011 A1    May 3, 2007

(30) Foreign Application Priority Data
Jul. 14, 2005    (EP)    ................... 05405436

(51) Int. Cl.
*B32B 9/00*    (2006.01)
(52) U.S. Cl. .................. 428/698; 428/699; 428/701; 428/702
(58) Field of Classification Search ............. 428/698, 428/699, 701, 702
See application file for complete search history.

(56) References Cited

U.S. PATENT DOCUMENTS

| 4,249,913 A | 2/1981 | Johnson et al. |
| 4,741,973 A * | 5/1988 | Condit et al. ............... 428/553 |
| 5,935,407 A | 8/1999 | Nenov et al. |
| 5,997,248 A | 12/1999 | Ghasripoor et al. |

FOREIGN PATENT DOCUMENTS

| EP | 0 272 197 | 6/1988 |
| GB | 2 301 110 | 11/1996 |
| WO | WO 87/07197 | 12/1987 |

* cited by examiner

Primary Examiner—Gwendolyn Blackwell
(74) Attorney, Agent, or Firm—Greenblum & Bernstein, P.L.C.

(57) ABSTRACT

A surface having an abrasive coating which includes silicon carbide (SiC) particles bound to the surface so as to form the abrasive coating. The SiC particles include a self-healing barrier layer that is in contact with an outer surface of the SiC particles. The self-healing barrier layer prevents degradation of the SiC particles.

27 Claims, 3 Drawing Sheets

Figure 1:
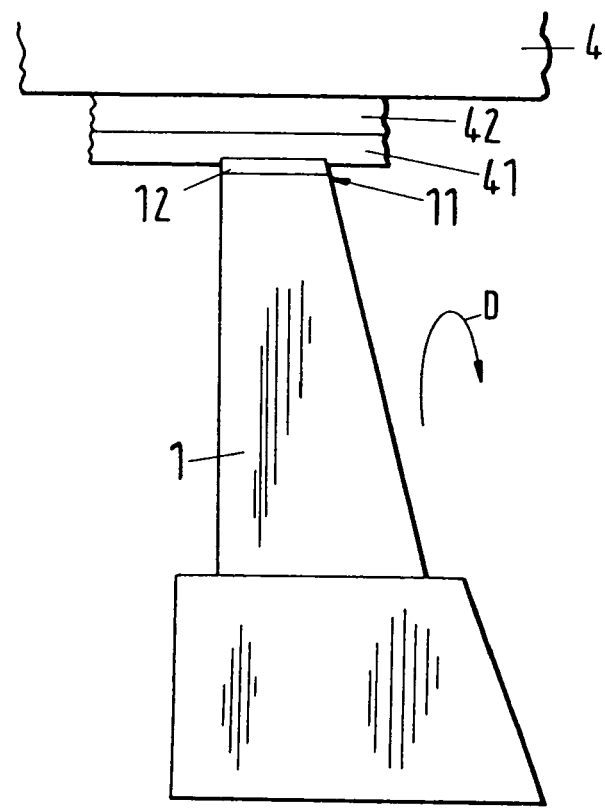

METHOD FOR THE TREATMENT OF THE TIP OF A TURBINE BLADE AND A TURBINE BLADE TREATED WITH A METHOD SUCH AS THIS

The invention relates to a method for the treatment of the tip of a turbine blade and a turbine blade treated with such a method in accordance with the pre-characterising part of the independent claim in the respective category.

In the operation of turbines which are used for example as engines for aeroplanes or as land based industrial gas turbines, it is desirable, from the point of view of efficiency to keep the clearance between the tips of the turbine blades and the corresponding seals in the housing as small as possible. If this gap is too large, the degree of efficiency of the turbines is reduced because a too large amount of the high energy gas can escape through this gap unused. For this reason the tips of the turbine blades is provided with abrasive coatings which make it possible for the tips of the turbine blades to cut their own way into the abradable seals when rotating, at least in the first hours of operation. The abrasive coatings usually contain hard grinding or cutting particles which cut into the seal. It is known to embed these particles into an oxidation resistant metallic matrix which is provided on the surface of the tip of the blade.

It is known from example from U.S. Pat. No. 5,935,407 to embed the particles in a metallic matrix by means of galvanic techniques. This document discloses cubic bornitride (cBN), a ceramic which is often used today for applications of this kind as the hard grinding particles. However the cBN particles have the characteristic that they oxidise quickly at high temperatures of more than 800° C. for example, so that the abrasive coating degrades to a considerable degree.

It is further known to use silicon carbide (SiC) as a hard particle in the abrasive coating (see for example U.S. Pat. No. 4,249,913). However SiC has the disadvantage that it is not stable enough thermodynamically, in particular when it comes into contact with superalloys. Particularly for turbines which are operated at very high temperatures, it is however usual today to manufacture the turbine blades from such superalloys which are usually nickel or cobalt based alloys. Due to its thermodynamic instability contact of SiC with nickel leads for example to the formation of silicides which leads to the degradation of the SiC and thus of the abrasive coating. As a solution to the problem, it is suggested in the U.S. Pat. No. 4,249,913 to coat the SiC particles with aluminium oxide ($Al_2O_3$) in order to thus prevent a direct contact of the SiC with the metallic matrix and thus a diffusion and/or reaction of the silicon with the metallic matrix. The disadvantage of this solution is however that in the case of injuries such as cracks or fissures in the aluminium oxide layer a direct contact is again possible between the silicon and the metallic matrix which leads to degradation of the SiC particles and thus of the abrasive coating.

Starting from this state of the art it is thus an object of the invention to propose a method for the treatment of the blade tip of a turbine blade which makes possible the production of an abrasive coating which, while having good cutting and grinding characteristics has an increased resistance against degradation effects. It is further an object of the invention to propose a turbine blade which has been treated in this manner.

The subject matter of the invention satisfying this object are characterised by the features of the independent claims in the respective category.

Thus, in accordance with the invention a method for the treatment of the blade tip of a turbine blade is proposed in which silicon carbide (SiC) particles are bound to the surface of a turbine blade for the production of an abrasive coating, with a self-healing barrier layer being produced on the SiC particles.

Due to the fact that the barrier layer, which serves as a diffusion and reaction barrier, is self-healing, not even cracks in the coating of the SiC particles lead to a degradation because these cracks are closed again by the self-healing characteristics and thus a contact between the SiC particles and metallic components can be permanently prevented. A clear increase of the length of life of the abrasive coating results from this.

In a preferred way of conducting the method, the self-healing barrier layer is produced on the SiC particles before the SiC particles are applied to the surface of the blade tip. This facilitates a simple and efficient coating of the SiC particles.

The self-healing barrier layer is preferably produced by means of coating with a material which is selected from the group comprising chrome (Cr), zirconium (Zr), titanium (Ti), tantalum (Ta), niobium (Nb), hafnium (Hf), yttrium (Y), scandium (Sc), thorium (Th), uranium (U), molybdenum (Mo), and also alloys of the named elements. The coating with these materials leads to the formation of good barrier layers which are self-healing.

The barrier layer is particularly preferably produced by coating with chrome or with a chrome alloy. By coating with chrome a thermodynamically stable chrome-silicon-carbide layer $Cr_5Si_3C$ forms at the Cr—SiC-boundary, which forms a barrier for diffusion and chemical reaction processes. If a crack should form which extends through the Cr—SiC-boundary layer, then chrome wanders into the region of this crack whereby this is closed.

In accordance with an advantageous way of conducting the method the SiC particles are bound to the surface of the blade tip by means of embedding them into a metallic matrix. It has proved that the SiC particles are embedded into a MCrAlX matrix wherein M denotes nickel (Ni) and/or cobalt (Co) and/or iron (Fe) and X denotes yttrium (Y) and/or zirconium (Zr) and/or hafnium (Hf).

A preferred possibility for the production of the abrasive coating is that the SiC particles provided with the barrier layer are secured to a carrier, for example to a thin metal plate, subsequently a metal matrix is subsequently produced by coating into which at least the surface regions of the SiC particles remote from the carrier are embedded, the surface remote from the carrier is secured to the blade tip and the carrier is removed. This method guarantees that no gaps or holes are present between the SiC particles and the surface of the blade tip from which a particularly good and reliable fixing of the SiC particles results.

A likewise preferred variation of the method which brings the same advantages with it is carried out so that SiC particles are secured on a carrier, for example on a thin metal plate, the barrier layer is produced on the SiC particles, in particular by means of a PVD method, subsequently a metallic matrix is produced into which at least the surface regions of the SiC particles remote from the carrier are embedded, the surface remote from the carrier is secured on the blade tip and the carrier is removed.

In these two method variations the surface remote from the carrier is preferably secured on the blade tip by means of brazing.

For practical reasons it is preferred to produce the metallic matrix by physical deposition from the vapour phase, in other words a PVD method and in particular by means of a high-speed PVD method.

A different method consists of the SiC particles being bound to the blade tip by means of brazing.

It can be advantageous in this arrangement, if prior to the brazing a MCrAlX layer is initially produced on the blade tip, wherein M denotes nickel (Ni) and/or cobalt (Co) and/or iron (Fe) and X denotes yttrium (Y) and/or zirconium (Zr) and/or hafnium (Hf). The MCrAlX layer is preferably produced by means of a PVD method, in particular a high speed PVD method.

A further possibility is to bond the SiC particles to the blade tip by laser welding.

In particular, in the case of brazing of the SiC particles, it can be advantageous when the Sic particles are provided with a protective layer in addition to the barrier layer, preferably with a protective layer of MCrAlX, wherein M denotes nickel (Ni) and/or cobalt (Co) and/or iron (Fe) and X denotes yttrium (Y) and/or zirconium (Zr) and/or hafnium (Hf).

The turbine blade in accordance with the invention is characterised in that it has a blade tip, which is treated according to a method in accordance with the invention.

This is in particular a turbine blade the blade tip of which is provided with an abrasive coating, which contains SiC particles, wherein the SiC particles have a self-healing barrier layer. The resultant advantages are analogue to those of the method in accordance with the invention.

In a preferred embodiment of the turbine blade the barrier layer is produced by coating with a material which is selected from the group comprising chrome (Cr), zirconium (Zr), titanium (Ti), tantalum (Ta), niobium (Nb), hafnium (Hf), yttrium (Y), scandium (Sc), thorium (Th), uranium (U), molybdenum (Mo), and also alloys of the named elements.

The barrier layer is particularly preferably produced by coating with chrome or a chrome alloy (chromised).

In a preferred embodiment of the turbine blade the SiC particles are bound to the surface of the blade tip by means of embedding into a metallic matrix.

The SiC particles are particularly preferably embedded into a MCrAlX matrix wherein M denotes nickel (Ni) and/or cobalt (Co) and/or iron (Fe) and X denotes yttrium (Y) and/or zirconium (Zr) and/or hafnium (Hf).

Further advantageous measures and preferred embodiments of the invention result from the dependent claims.

Figure 2:
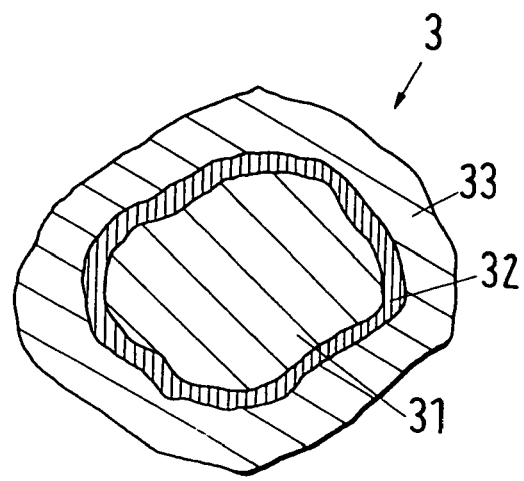
Figure 3:
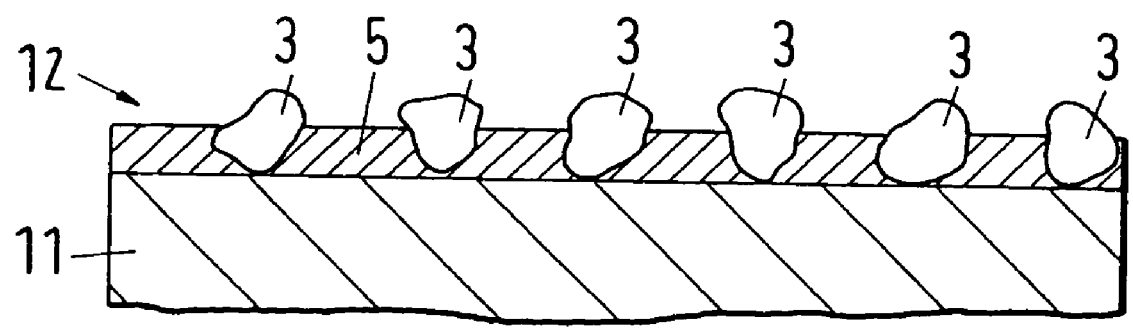
Figure 4:
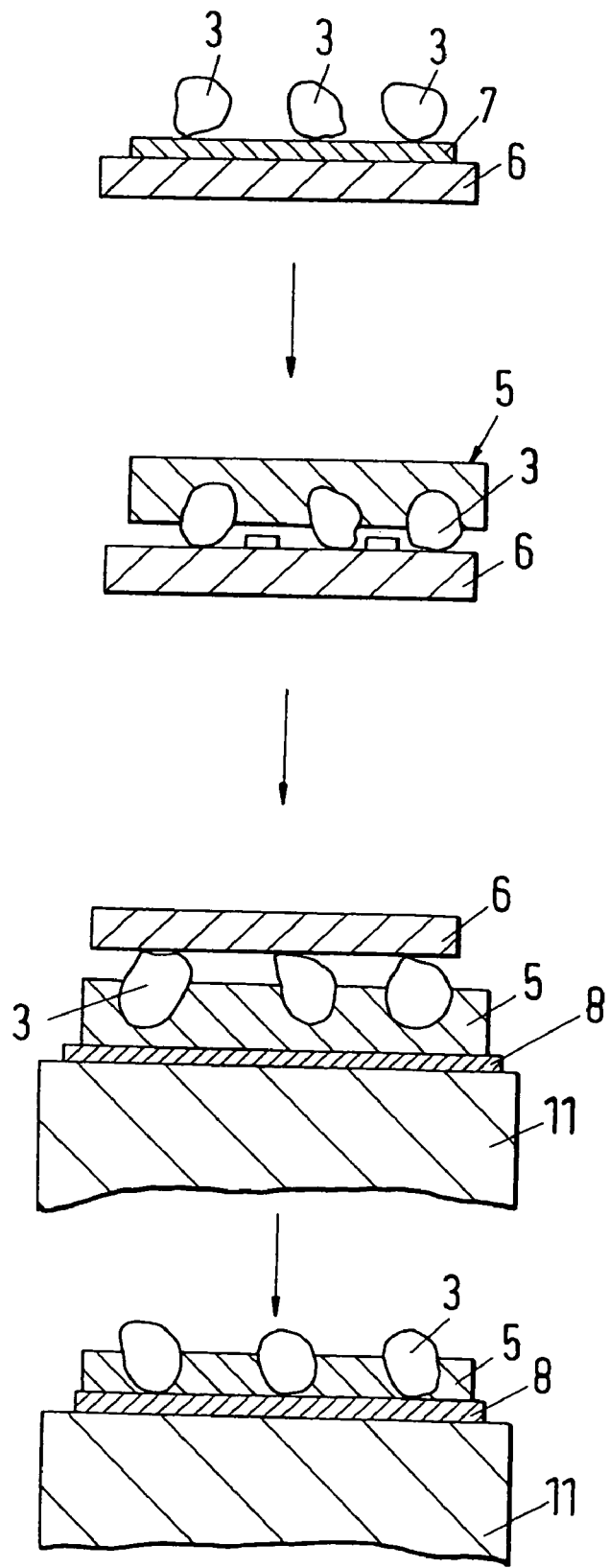

The invention will be explained in more detail with reference to the embodiments and with the help of the drawings. The schematic drawings show:

FIG. 1 an embodiment of a turbine blade in accordance with the invention,

FIG. 2 a schematic illustration of a SiC particle with an embodiment of a barrier layer in accordance with the invention, FIG. 3 a section through an abrasive layer on the blade tip of a turbine blade produced using a method in accordance with the invention, and FIG. 4 a preferred way of conducting the method.

FIG. 1 shows in schematic illustration an embodiment of a turbine blade in accordance with the invention which is denoted as a whole with the reference number 1. The turbine blade 1 has a blade tip 11, which means the end of the turbine blade 1 furthest removed from the axis of rotation. An abrasive layer 12 is provided on the surface of the blade tip 11, which cooperates with an abradable seal 41 in a manner known per se in the operating state of the turbine. The abradable seal 41 is secured to a housing 4 of the turbine by means of a carrier medium 42. The seal 42 can be manufactured from a ceramic material for example. The abrasive layer 12 is produced by means of a method in accordance with the invention, which will be explained later on.

The direction of rotation of the turbine blade 1 is shown by the arrow D, in other words the turbine blade 1 rotates into the plane of drawing. At least during the first operating hours the turbine blade 1 grinds or cuts its way through the abradable seal 41. The result of this is that the clearance or gap between the blade tip 11 and the seal 41 is as small as possible so that very little of the highly energetic gas is able to escape unused through this gap.

The method in accordance with the invention for treating the blade tip 11 of the turbine blade 1 is in particular characterised in that silicon carbide (SiC) particles are bound to the surface of the blade tip 11 for the production of the abrasive coating, wherein a self-healing barrier layer is provided on the SiC particles.

FIG. 2 shows a sectional view of an embodiment of such a coated SiC particle, which is provided with the reference numeral 3 as a whole. The coated SiC particle 3 includes the actual SiC particle 31, the self-healing barrier layer 32 and also a material 33 with which the SiC particle 31 was coated for the production of the barrier layer 32.

It is known that SiC is not thermodynamically stable. In particular the contact with metals or metallic compounds, for example nickel (Ni) or nickel alloys leads to degradation of the SiC. This can result in the formation of silicides in the form of different nickel silicon compounds and to the deposition of pure carbon so that SiC is decomposed on contact with Ni.

Ni and Ni alloys are of great significance for this reason because many of the super alloys, which are typically used to manufacture turbine blades for very high operating temperatures, of over 800° C. for example, are nickel based alloys.

In order to avoid contact between nickel (or also a different metallic element of the turbine blade) and the SiC particles the self-healing barrier layer 32 is provided on the SiC particles 31 in accordance with the invention which serves as a diffusion and chemical reaction barrier between the SiC and its metallic environment. For this purpose, it is possible for example to produce carbides or carbide compounds on the SiC particles which are thermodynamically more stable than the SiC.

A characteristic of the barrier layer 32, which is important to the invention, is that it is self-healing. The barrier layer 32 is an active layer, which in the event of injuries "repairs" itself. This means that when there are cracks or injuries, which extend through the barrier layer 32 right up to the SiC, then particles diffuse out of the layer with the material 33 into the region of the crack or the injury, combine with the silicon and thus close the crack or the injury in the barrier layer 32. A degradation of the SiC particles 31 is avoided effectively through this self-healing characteristic, by which means a particularly durable and fully functioning abrasive coating 12 is realised which also remains stable at temperatures of over 800° C., does not oxidise and has very good cutting and grinding characteristics in relation to abradable seals 41.

In a particularly preferred way of conducting the method the barrier layer 32 is produced by coating the SiC particles 31 with one of the following elements: chrome (Cr), zirconium (Zr), titanium (Ti), tantalum (Ta), niobium (Nb), hafnium (Hf), yttrium (Y), scandium (Sc), thorium (Th), uranium (U), molybdenum (Mo). Alloys of the named elements can also be used for the production of the barrier layer. The coating of these elements leads to the formation of carbides which are thermodynamically more stable than SiC.

Reference will be made in the following as an example to the case, which is particularly relevant and preferred in practice, in which the barrier layer 32 in accordance with the invention is produced by coating the SiC particles with chrome. The comments apply however in the same way for other elements or alloys.

The SiC particles 3 are preferably bound to the surface of the blade tip by means of embedding into a metallic matrix. FIG. 3 shows a section through an abrasive coating 12 on the blade tip 11 of a turbine blade. The coated SiC particles 3 are embedded into a metallic matrix 5, which is provided at the surface of the blade tip 11. The metallic matrix 5 is preferably a matrix of the type MCrAlX wherein M denotes nickel (Ni) and/or cobalt (Co) and/or iron (Fe) and X denotes yttrium (Y) and/or zirconium (Zr) and/or hafnium (Hf). The element Yttrium is particularly advantageously used for X.

A few special embodiments of the method in accordance with the invention will be explained in the following.

A preferred measure consists in coating the SiC particles 31 before they are applied to the surface of the blade tip 11. Commercially available SiC particles are used as the starting material which preferably have a diameter of 500 μm (micrometer) at most and in particular a diameter of 300-400 μm. the SiC particles are then coated with chrome (Cr) so that they have as even a chrome layer 33 as possible, which is approximately 10 μm thick for example. The chrome coating can take place by means of all methods, which are known per se. Thermo-chemical processes, pack cementation, physical or chemical deposition out of the vapour phase (PVD: physical vapour deposition; CVD: chemical vapour deposition), deposition from solutions or slurries or galvanic processes are particularly suitable for production of the chrome layer 33. These methods for the production of chrome layers are common knowledge for the person averagely skilled in the art and therefore require no further explanation.

When the SiC particles 31 (FIG. 2) are coated then a formation of a chrome-silicon-carbide layer with the chemical composition $Cr_5Si_3C$ takes place in the boundary zone between the SiC and the Cr. This barrier layer 32 is surrounded at the outside with a layer 33 of elementary Cr. The $Cr_5Si_3C$ has self-healing characteristics in particular. Should a crack develop then elemental Cr will diffuse out of the layer 33 into the region of the crack and will heal this. By this means the diffusion is prevented of other metallic elements—such as nickel for example—from the alloy of which the turbine blade is made, or from the metallic matrix 5 into the Sic, and thus a degradation of the abrasive coating is avoided. It has been shown that the $Cr_5Si_3C$—SiC system is thermodynamically and chemically stable, even at temperatures of 1000° C.

It can be advantageous to subsequently subject the SiC particles 3 which have been coated with chrome or a chrome alloy to a heat treatment, preferably in the region between 900° C. and 1600° C. in order to guarantee a particularly good and slightly to not porous formation of the barrier layer 32—here in other words of the $Cr_5Si_3C$ layer.

After the SiC particles 31 have been coated with chrome they have to be bound to the surface of the blade tip 11 of the turbine blade 1. The turbine blade is usually manufactured from a superalloy, for example a nickel-based alloy such as is obtainable under the trade name Inconel 718. The SiC particles 31 provided with the chrome layer 33 and the barrier layer 32 are provisionally secured to the surface of the blade tip 11 initially. This can take place by adhesion with an epoxy resin or by a polymerisation process. Subsequently the metallic matrix 5 (see FIG. 3) is generated on the blade tip 11 into which the coated SiC particles 3 are embedded. In accordance with a preferred method the metallic matrix 5 which is of the type MCrAlX—wherein the element Ni is preferred for M—is generated by a physical deposition out of the vapour phase (PVD: physical vapour deposition). Various PVD methods, which are suitable for this, are known to the person averagely skilled in the art so that in this connection no further explanation is necessary. The HS-PVD method (HS: high speed) is particularly suitable in which particularly high deposition rates are used. The metallic matrix 5 is produced with a thickness of approximately 350 μm in this embodiment. By means of the deposition of the metallic matrix the SiC particles are embedded into this matrix and by this means are secured firmly to the surface of the turbine blade 11. Thus the turbine blade 1 receives the abrasive coating 12 on its blade tip 11 which contains the coated SiC particles as grinding and/or cutting elements.

It is alternatively also possible to first firmly adhere the not yet coated SiC particles 31 to the blade tip 11, by means of an epoxy resin for example, then in a first step to coat the SiC particles 31 by means of a PVD method, whereby a formation of the barrier layer 32 and the chrome layer 33 takes place and ultimately in a second step to deposit the metallic matrix 5 on the blade tip 11 by means of a PVD process so that the SiC particles are embedded into the matrix 5 and are bound on the blade tip 11.

In order to achieve an even better and more durable compound between the SiC particles 3 and the blade tip 11, the embodiment of the method in accordance with the invention seen in FIG. 4 is suitable.

As shown in the top illustration in FIG. 4 the coated SiC particles are initially secured on a carrier 6, for example through adhesion by means of an epoxy resin 7. The carrier 6 is preferably a metallic plate which is approximately 1-2 mm thick, for example a Ni plate or a plate made from the nickel based alloy Inconel 718. The SiC particles secured on the carrier 6 are then coated with a metallic matrix 5 of the MCrAlX type in a PVD process, wherein M is preferably Ni. The metallic matrix 5 is produced with a thickness of approximately 10-200 μm. This is shown in the second drawing from the top in FIG. 4. By this step the upper ends, according to the drawing, and preferably at least the upper halves of the surface regions of each of the coated SiC particles 3 are coated with the metallic matrix 5. As the third illustration from the top in FIG. 4 shows, the carrier 6 is now turned upside down and the matrix 5 covering the SiC particles is secured to the surface of the blade tip 11 by means of brazing so that "feet" of the SiC particles coated with the MCrAlX are embedded into the braze layer 8. Finally, as the bottom drawing in FIG. 4 shows, the carrier 6 is removed. This can be done by means of bending, peeling, grinding or any other suitable processing method.

This method guarantees that there is no formation of cavities between the SiC particles and the surface of the blade tip 11. A particularly good and reliable connection results from this between the SiC particles 3 and the blade tip 11, by which means the abrasive coating 12 is secured to the blade tip 11 particularly well and durably.

It is alternatively also possible in the method seen in FIG. 4 to initially firmly adhere the uncoated SiC particle 31 on the carrier 6 and then to provide the SiC particles 31 with the chrome layer or one of the possible alternative layers 33 in a first PVD process, by which means the barrier layer 32 forms. The chrome layer is preferably applied with a thickness of approximately 10 μm. Subsequently a MCrAlX layer of 100-200 μm thickness for example is applied, likewise by means of PVD, whereby the upper ends according to the drawing and preferably at least the upper halves of the surface regions of each of the Cr coated SiC particles 3 are coated with the metallic MCrAlX. Now the carrier 6 with the partially MCrAlX coated SiC particles 3 is turned around and the MCrAlX matrix 5 covering the SiC particles is secured to the surface of the blade tip 11 by means of brazing, so that the "feet" of the SiC particles coated with MCrAlX are embedded into the braze layer. Finally the carrier 6 is removed.

As an alternative to the manufacture of the metallic matrix 5 by means of a PVD method it is also possible to embed the Cr coated SiC particles 3 by means of brazing into a metallic matrix and to secure them on the surface of the blade tip 11. If the SiC particles 3 are bound to the blade tip by means of brazing it is also advantageous to initially secure the Cr coated SiC particles 3 provisionally on the blade tip 11, for example by means of adhesive bonding by means of epoxy resin and then to begin the brazing process.

The selection of a suitable hard solder depends on the specific application. A few possibilities will be explained in the following, which refer with exemplary character to turbine blades 1, which are manufactured from the nickel-based alloy Inconel 718.

It is possible in principle to carry out brazing with or without the use of a filling material (filler). Suitable brazing materials are for example such hard solders which belong to the product group which is marketed by the Applicant under the trade name Amdry. Amdry 936—this is a Ni—Mn—Si—B—Cu—Re high-temperature brazing material—or Amdry 775, a solder on nickel basis with Cr and B (boron) are particularly suitable for example. If a filler is used Amdry 9951 is particularly suitable for this. This is a Co based material with Ni, Cr, Al and Y.

A MCrAlX matrix 5 into which the coated Si-particles are embedded can also be produced through the process of brazing.

An advantageous measure is to provide the blade tip 11 with a MCrAlX layer prior to brazing which is approximately 50 µm thick for example and is preferably generated by means of a PVD method. The Cr coated SiC particles 3 are subsequently secured on this layer by means of brazing. The previously applied MCrAlX layer serves as an intermediary barrier between the material of the blade tip 11 and the SiC particles 3, which prevents or at least greatly reduces the diffusion of Ni from the blade material Inconel 718 during the brazing.

A further variant consists in securing the coated SiC particles on the blade tip by means of laser welding. The possibility also exists here of first producing a MCrAlX layer on the blade tip 11 by means of laser welding, wherein X is preferably yttrium (Y) and to then secure the Cr coated SiC particles on the blade tip 11 by means of laser welding, wherein a MCrAlX rich filler material is preferably used. Thus the SiC particles 3 can also be embedded into a MCrAlX matrix on the blade tip by means of laser welding.

In particular in the method using brazing and laser welding it can be advantageous when the Cr coated SiC particles 3 are enclosed with an additional protective layer prior to the welding or laser process. This protective layer is preferably also of the MCrAlX type, with nickel being preferred for M and yttrium being preferred for X. The cladding methods which can be used for the production of the protective layer are known per se and therefore do not require any further explanation here.

The possibility also exists of firstly depositing a MCrAlX matrix on the turbine blade 11, preferably by means of a PVD method and of embedding the coated SiC particles 3 therein galvanically or respectively by means of an electro-chemical method.

It will be understood that the blade tips treated with the method in accordance with the invention or the turbine blades in accordance with the invention can be subjected to additional thermal treatments or after treatments. The optimisation of such treatments takes place in dependence on the particular application.

The invention claimed is:

1. A surface having an abrasive coating comprising silicon carbide (SiC) particles bound to the surface so as to form the abrasive coating, wherein the SiC particles include a self-healing barrier layer that is in contact with an outer surface of the SiC particles, wherein the self-healing barrier layer is structured and arranged to prevent degradation of the SiC particles.

2. The surface of claim 1, wherein the surface is arranged on a blade tip.

3. The surface of claim 2, wherein the blade tip is arranged on a turbine blade.

4. The surface of claim 1, wherein each of the SiC particles include the self-healing barrier layer in direct contact with the outer surface and wherein the self-healing barrier layer is arranged between each SiC particle and an outer layer.

5. The surface of claim 1, wherein the self-healing barrier layer comprises a material which is selected from the group comprising chrome (Cr), zirconium (Zr), titanium (Ti), tantalum (Ta), niobium (Nb), hafnium (Hf), yttrium (Y), scandium (Sc), thorium (Th), uranium (U), molybdenum (Mo), and also alloys of the named elements.

6. The surface of claim 1, wherein the SiC particles are embedded in a metallic matrix.

7. The surface of claim 6, wherein the metallic matrix comprise a MCrAlX matrix wherein M denotes nickel (Ni) and/or cobalt (Co) and/or iron (Fe) and X denotes yttrium (Y) and/or zirconium (Zr) and/or hafnium (Hf).

8. An abrasive coating for a blade tip of a turbine blade, the abrasive coating comprising SiC particles having an outer surface forming a boundary zone with a self-healing barrier layer that prevents degradation of the SiC particles, wherein the SiC particles are embedded in a MCrAlX matrix wherein M denotes nickel (Ni) and/or cobalt (Co) and/or iron (Fe) and X denotes yttrium (Y) and/or zirconium (Zr) and/or hafnium (Hf), wherein the SiC particles include a barrier layer comprising a material which is selected from the group comprising chrome (Cr), zirconium (Zr), titanium (Ti), tantalum (Ta), niobium (Nb), hafnium (Hf), yttrium (Y), scandium (Sc), thorium (Th), uranium (U), molybdenum (Mo), and also alloys of the named elements.

9. The surface of claim 1, wherein an outside surface of each SiC particle is not in direct contact with $Al_2O_3$.

10. The surface of claim 1, further comprising a boundary zone formed between the outer surface and the self-healing barrier layer having a chemical composition of $Cr_5Si_3C$.

11. The surface of claim 10, further comprising an outer layer arrange outside the self-healing barrier layer.

12. The surface of claim 11, wherein the outer layer is elementary Cr.

13. A surface having an abrasive coating comprising silicon carbide (SiC) particles bound to the surface so as to form the abrasive coating, wherein:

each SiC particle includes an outer surface, a first layer arranged outside the outer surface, and a second layer arranged outside of the first layer;

the first layer is an active self-healing barrier layer that is structured and arranged to repair itself; and a boundary zone is formed by the outer surface and the self-healing barrier layer.

14. The surface of claim 13, wherein the self-healing barrier layer prevents degradation of the SiC particle.

15. The surface of claim 13, wherein the surface is arranged on a blade tip.

16. The surface of claim 15, wherein the blade tip is arranged on a turbine blade.

17. The surface of claim 13, wherein the first and second layers comprise different materials.

18. The surface of claim 13, wherein the self-healing barrier layer comprises a material which is selected from the group comprising chrome (Cr), zirconium (Zr), titanium (Ti), tantalum (Ta), niobium (Nb), hafnium (Hf), yttrium (Y), scandium (Sc), thorium (Th), uranium (U), molybdenum (Mo), and also alloys of the named elements.

19. The surface of claim 13, wherein the SiC particles are embedded in a metallic matrix.

20. The surface of claim 19, wherein the metallic matrix comprise a MCrAlX matrix wherein M denotes nickel (Ni) and/or cobalt (Co) and/or iron (Fe) and X denotes yttrium (Y) and/or zirconium (Zr) and/or hafnium (Hf).

21. The surface of claim 13, wherein the boundary zone has a chemical composition $Cr_5Si_3C$.

22. The surface of claim 21, wherein the second layer is Cr.

23. The surface of claim 13, wherein the second layer is Cr.

24. A surface having an abrasive coating comprising silicon carbide (SiC) particles bound to the surface so as to form the abrasive coating, wherein:

each SiC particle includes an outer surface, a self-healing barrier layer arranged outside the outer surface, a boundary zone formed between the outer surface and the self-healing barrier layer, and an outer layer arranged outside of the self-healing barrier layer; and the SiC particles are embedded in a metallic matrix.

25. The surface of claim 24, wherein the self-healing barrier layer comprises a material which is selected from the group comprising chrome (Cr), zirconium (Zr), titanium (Ti), tantalum (Ta), niobium (Nb), hafnium (Hf), yttrium (Y), scandium (Sc), thorium (Th), uranium (U), molybdenum (Mo), and also alloys of the named elements.

26. The surface of claim 24, wherein the boundary zone has a chemical composition of $Cr_5Si_3C$.

27. The surface of claim 25, wherein the outer layer is Cr.

* * * * *